(12) United States Patent
Ishino

(10) Patent No.: US 7,868,598 B2
(45) Date of Patent: Jan. 11, 2011

(54) SWITCHING REGULATOR

(75) Inventor: Tsutomu Ishino, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 429 days.

(21) Appl. No.: 11/817,091

(22) PCT Filed: Mar. 9, 2006

(86) PCT No.: PCT/JP2006/304588

§ 371 (c)(1),
(2), (4) Date: Aug. 24, 2007

(87) PCT Pub. No.: WO2006/095811

PCT Pub. Date: Sep. 14, 2006

(65) Prior Publication Data

US 2009/0021232 A1    Jan. 22, 2009

(30) Foreign Application Priority Data

Mar. 10, 2005  (JP)  ............... 2005-067259

(51) Int. Cl.
G05F 1/00 (2006.01)
(52) U.S. Cl. .................. 323/282; 323/222; 323/271
(58) Field of Classification Search ................. 323/282, 323/242, 243, 271, 288, 222, 273
See application file for complete search history.

(56) References Cited

U.S. PATENT DOCUMENTS

| | | | | |
|---|---|---|---|---|
| 6,069,471 A | * | 5/2000 | Nguyen | 323/271 |
| 6,147,478 A | * | 11/2000 | Skelton et al. | 323/288 |
| 6,958,595 B2 | * | 10/2005 | Niiyama et al. | 323/282 |
| 7,235,954 B2 | | 6/2007 | Murakami | |
| 2002/0005712 A1 | * | 1/2002 | Ochi et al. | 323/282 |

FOREIGN PATENT DOCUMENTS

| | | |
|---|---|---|
| EP | 1 499 465 | 1/2005 |
| JP | 06-13387 | 2/1994 |
| JP | 2004-208440 | 7/2004 |
| JP | 2005-033853 | 2/2005 |

OTHER PUBLICATIONS

Coupled—Definition and More from the Free Merriam-Webster Dictionary http://www.merriam-webster.com/dictionary/coupled.*

* cited by examiner

*Primary Examiner*—Bao Q Vu
*Assistant Examiner*—Nguyen Tran
(74) *Attorney, Agent, or Firm*—Fish & Richardson P.C.

(57) ABSTRACT

A switching regulator according to the invention includes a resistor (R3) and a capacitor (C3) for generating a ramp signal from the AC component in the output of a hysteresis comparator (1). The switching regulator is characterized in that the hysteresis comparator (1) compares with a reference voltage outputted from a reference voltage source (2) a voltage obtained by superimposing the ramp signal on the divided voltage of the output voltage ($V_O$) as obtained between resistors (R1 and R2).

3 Claims, 3 Drawing Sheets

SWITCHING REGULATOR

TECHNICAL FIELD

The present invention relates to a switching regulator, and more particularly to a switching regulator that switches a switching element based on an output of a hysteresis comparator.

BACKGROUND ART

Conventionally, there have been proposed various switching regulators that perform switching based on the output of a hysteresis comparator (for example, see patent document 1 below). Such a switching regulator includes a smoothing circuit for smoothing a signal corresponding to the switching operation of a switching element to generate the output voltage of the switching regulator. The smoothing circuit generally includes an inductor and a capacitor.

Patent document 1: JP-U-H06-013387 (FIG. 1)

DISCLOSURE OF THE INVENTION

Problems to be Solved by the Invention

In a conventional switching regulator that performs switching based on the output of a hysteresis comparator, when the inductance and capacitance of the inductor and capacitor included in the smoothing circuit mentioned above are increased, the ripple voltage contained in the output voltage of the switching regulator is reduced. Doing so, however, increases the areas occupied by the inductor and the capacitor, and lowers the switching frequency.

Usually, due to the limited mounting area and other restrictions, the inductance and capacitance of the above-mentioned inductor and capacitor cannot be increased. Thus, a conventional switching regulator that performs switching based on the output of a hysteresis comparator suffers from a high ripple voltage contained in the output voltage thereof.

An object of the present invention is to provide a switching regulator that switches a switching element based on an output of a hysteresis comparator and that permits a switching frequency to be set irrespective of the time constant of a smoothing circuit for smoothing a signal corresponding to the switching operation of the switching element to generate the output voltage of the switching regulator, and to provide an electrical device incorporating such a switching regulator.

Means for Solving the Problem

To achieve the above object, according to one aspect of the present invention, a switching circuit for a switching regulator includes: a hysteresis comparator; a switching element switched based on an output of the hysteresis comparator; a first terminal outputting a signal corresponding to switching operation of the switching element; a second terminal receiving an output voltage of the switching regulator; and a resistor and a capacitor generating a ramp signal from an alternating-current component in the output of the hysteresis comparator. Here, the hysteresis comparator compares with a reference voltage a voltage obtained by superimposing the ramp voltage on a voltage based on the output voltage of the switching regulator.

By connecting the input terminal of a smoothing circuit to the first terminal of the switching circuit for a switching regulator configured as described above, and connecting the output terminal of the smoothing circuit to the second terminal of the switching circuit for a switching regulator configured as described above, it is possible to realize a switching regulator to achieve the above object. The output voltage of the smoothing circuit serves as the output voltage of the switching regulator.

To achieve the above object, according to another aspect of the invention, a switching regulator that switches a switching element based on an output of a hysteresis comparator includes a resistor and a capacitor generating a ramp signal from an alternating-current component in the output of the hysteresis comparator. Here, the hysteresis comparator compares with a reference voltage a voltage obtained by superimposing the ramp voltage on a voltage based on the output voltage of the switching regulator.

With this configuration, a switching frequency is determined by the resistance of the resistor and the capacitance of the capacitor irrespective of the time constant of a smoothing circuit for smoothing a signal corresponding to the switching operation of the switching element to generate the output voltage of the switching regulator. Thus, it is possible to set a switching frequency irrespective of the time constant of a smoothing circuit for smoothing a signal corresponding to the switching operation of the switching element to generate the output voltage of the switching regulator. By reducing the resistance of the resistor and the capacitance of the capacitor, it is possible to increase the switching frequency. Hence, it is possible to reduce the ripple in the output voltage of the switching regulator.

In a switching regulator according to the invention, switching frequency is lower than its ideal frequency by the value corresponding to the delay period occurring in a hysteresis comparator. In a conventional switching regulator, on the other hand, switching frequency is lower than its ideal frequency by the total of the delay periods occurring in a hysteresis comparator, a driver circuit and a switching element. Thus, with the switching regulator according to the invention, it is possible to alleviate the lowering in the switching frequency with respect to the ideal frequency as compared with the conventional switching regulator. This helps reduce the ripple in the output voltage.

As an example of the switching regulator described above, there is given a switching regulator that includes a resistor voltage division circuit dividing the output voltage of the switching regulator and a coupling capacitor providing alternating-current coupling between one end of the resistor and the output terminal of the hysteresis comparator. Here, the other end of the resistor is connected to a voltage division point in the resistor voltage division circuit and the capacitor is connected in parallel to a voltage division resistor in the resistor voltage division circuit. In this example, in order to obtain the desired responsiveness to a sharply varying load, it is preferable that the voltage division resistor connected in parallel to the capacitor be provided between the output terminal outputting the output voltage of the switching regulator and the voltage division point in the resistor voltage division circuit.

To achieve the above object, according to yet another aspect of the invention, an electrical device includes a switching regulator of any one of the configurations described above. With a switching regulator of any one of the configurations described above, it is possible to increase the switching frequency without increasing the time constant of a smoothing circuit for smoothing a signal corresponding to switching operation of the switching element to generate the output voltage of the switching regulator. Thus, such a switching regulator is particularly suitable for electrical devices when the electrical device is a portable device required to reduce the mounting area of its power supply.

Advantages of the Invention

With the present invention, it is possible to achieve a switching regulator that switches a switching element based on an output of a hysteresis comparator and that permits a switching frequency to be set irrespective of the time constant of a smoothing circuit for smoothing a signal corresponding to the switching operation of the switching element to generate the output voltage of the switching regulator, and also to achieve an electrical device incorporating such a switching regulator.

LIST OF REFERENCE SYMBOLS

Figure 1:
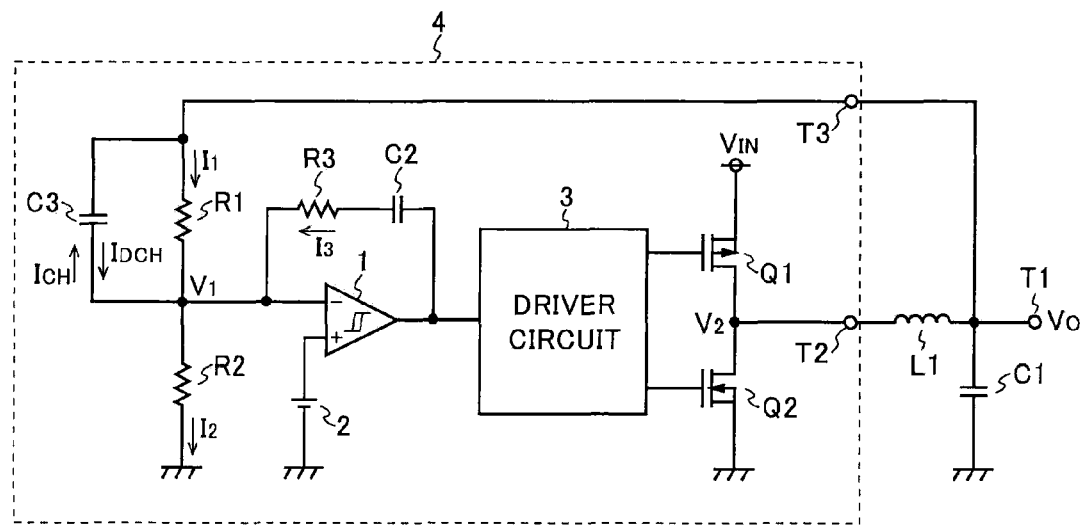
[FIG. 1] A diagram showing an example of the configuration of a switching regulator according to the invention.

1 Hysteresis comparator
2 Reference voltage source
3 Driver circuit
4, 4' Switching circuit
5 Control circuit
6 Antenna
7 Wireless communication section
8 Notification section
9 Liquid crystal display (LCD)
10 Key input section
11 Voice input section
12 Voice output section
13 Battery
14 to 17 Regulator
C1 Capacitor
L1 Inductor
Q1 PMOS transistor
Q2 NMOS transistor
R1 and R2 Resistor
T1 Output terminal
T2 and T3 Terminal

BEST MODE FOR CARRYING OUT THE INVENTION

Hereinafter, an embodiment of the present invention will be described with reference to the accompanying drawings. An example of the configuration of a switching regulator according to the invention is shown in FIG. 1.

The switching regulator shown in FIG. 1 includes a hysteresis comparator 1, a reference voltage source 2, a driver circuit 3, a P-channel MOS transistor (hereinafter called "PMOS transistor") Q1, an N-channel MOS transistor (hereinafter called "NMOS transistor") Q2, an inductor L1, capacitors C1 to C3, an output terminal T1, terminals T2 and T3 and resistors R1 to R3. The components in the switching regulator shown in FIG. 1 excluding the inductor 1, the capacitor C1 and the output terminal T1 forms a switching circuit 4, which is packaged into an integrated circuit.

One end of the resistor R1 is connected to the terminal T3, the other end of the resistor R1 is connected to one end of the resistor R2, and the other end of the resistor R2 is held at a ground potential. The inverting input terminal of the hysteresis comparator 1 is connected to the node between the resistors R1 and R2. The reference voltage source 2 feeds a predetermined reference voltage to the non-inverting input terminal of the hysteresis comparator 1.

The hysteresis comparator 1 sets a first reference voltage $V_{REF1}$ and a second reference voltage $V_{REF2}$ ($>V_{REF1}$) based on the predetermined reference voltage outputted by the reference voltage source 2, and performs comparison operations. Here, the predetermined reference voltage is equal to either the first reference voltage $V_{REF1}$ or the second reference voltage $V_{REF2}$. Ideally, the hysteresis comparator 1 continues to feed a low-level signal to the drive circuit 3 after the voltage $V_1$ fed to the inverting input terminal of the hysteresis comparator 1 becomes higher than the second reference voltage $V_{REF2}$ until the voltage $V_1$ becomes equal to the first reference voltage $V_{REF1}$; the hysteresis comparator 1 continues to feed a high-level signal to the drive circuit 3 after the voltage $V_1$ becomes lower than the first reference voltage $V_{REF1}$ until the voltage $V_1$ becomes equal to the second reference voltage $V_{REF2}$. Thus, the signal fed from the hysteresis comparator 1 to the driver circuit 3 is a pulse signal.

The driver circuit 3 turns on and off the PMOS transistor Q1 and the NMOS transistor Q2 based on the pulse signal fed from the hysteresis comparator 1. Specifically, the driver circuit 3 inverts the pulse signal fed from the hysteresis comparator 1 to feed a first drive signal corresponding to the inverted signal to the gate of the PMOS transistor Q1; the driver circuit 3 also inverts the pulse signal fed from the hysteresis comparator 1 to feed a second drive signal corresponding to the inverted signal to the gate of the NMOS transistor Q2. Thus, ideally, when the output of the hysteresis comparator 1 is high, the voltage $V_2$ appearing at the node between the PMOS transistor Q1 and the NMOS transistor Q2 is equal to an input voltage $V_{IN}$; when the output of the hysteresis comparator 1 is low, the voltage $V_2$ is equal to the ground potential GND.

One end of the resistor R3 is coupled on an AC (alternating-current) basis through the capacitor C2 to the output terminal of the hysteresis comparator 1, and the other end of the resistor R3 is connected to the inverting input terminal of the hysteresis comparator 1. The capacitor C3 is connected in parallel to the resistor R1.

With this configuration, the resistor R3 and the capacitor C3 generate a ramp signal from the AC component in the output of the hysteresis comparator 1, and the ramp signal is superimposed on the voltage obtained by dividing an output voltage $V_O$ with the resistors R1 and R2. The voltage obtained by superimposing the resulting ramp voltage on the divided voltage of the output voltage $V_O$, as obtained between the resistors R1 and R2, is the voltage $V_1$ fed to the inverting input terminal of the hysteresis comparator 1.

Figure 2:
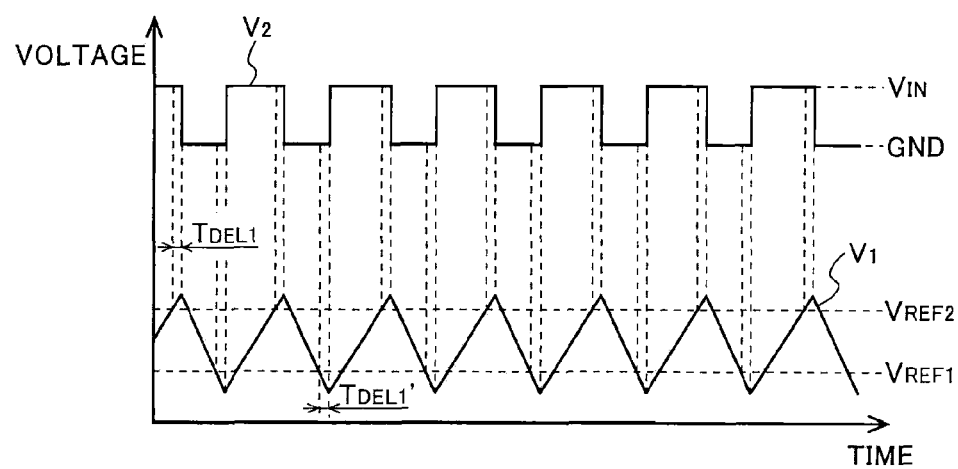
[FIG. 2] A diagram showing voltage waveforms observed at relevant points in the switching regulator shown in FIG. 1.

The relationship between the voltage $V_1$ fed to the inverting input terminal of the hysteresis comparator 1 and the voltage $V_2$ observed at the node between the PMOS transistor Q1 and the NMOS transistor Q2 is as shown in FIG. 2. As will be clear from FIG. 2, the switching frequency of the switching regulator shown in FIG. 1 is lower than its ideal frequency by the value corresponding to the delay period ($T_{DEL1}+T_{DEL1}'$) occurring in the hysteresis comparator 1.

The switching period $T_S$ of the switching regulator shown in FIG. 1 is obtained as follows. Here, it is assumed that the ripple in the voltage obtained by dividing the output voltage $V_O$ with the resistors R1 and R2 is small, that the currents $I_1$, $I_2$ and $I_3$ flowing through the resistors R1, R2 and R3, respectively, remain constant irrespective of whether the PMOS transistor Q1 and the NMOS transistor Q2 are on or off, and that the output of the hysteresis comparator 1, when it is high, equals the input voltage $V_{IN}$ and, when it is low, equals the ground potential (0 V). Hence, in terms of the average ($V_O$) of the voltage observed at the output terminal of the hysteresis comparator 1 and the average ($V_{REF}$) of the voltage observed at the non-inverting input terminal of the hysteresis comparator 1, the relationship "$V_{C2}=V_O-V_{REF}$" holds between the voltage $V_{C2}$ across the capacitor C2 and the output voltage $V_O$. Here, $V_{REF}$ represents an intermediate value between the first reference voltage $V_{REF1}$ and the second reference voltage $V_{REF2}$.

Since the current $I_1$ is equal to the current $I_2$, the charging current $I_{CH}$ and discharging current $I_{DCH}$ of the capacitor C3 are each equal to the current $I_3$. While the capacitor C3 is being charged, the output of the hysteresis comparator 1 is high. Thus, since $V_{C2}=V_O-V_{REF}$, the charging current $I_{CH}$ of the capacitor C3 is given by equation (1), where $R_3$ represents the resistance of the resistor R3.

$$I_{CH} = \frac{V_{IN} - V_{C2} - V_{REF}}{R_3} \quad (1)$$
$$= \frac{V_{IN} - V_O}{R_3}$$

While the capacitor C3 is being discharged, the output of the hysteresis comparator 1 is low. Thus, since $V_{C2}=V_O-V_{REF}$, the discharging current $I_{DCH}$ of the capacitor C3 is given by equation (2).

$$I_{DCH} = \frac{V_{C2} + V_{REF}}{R_3} \quad (2)$$
$$= \frac{V_O}{R_3}$$

Figure 3:
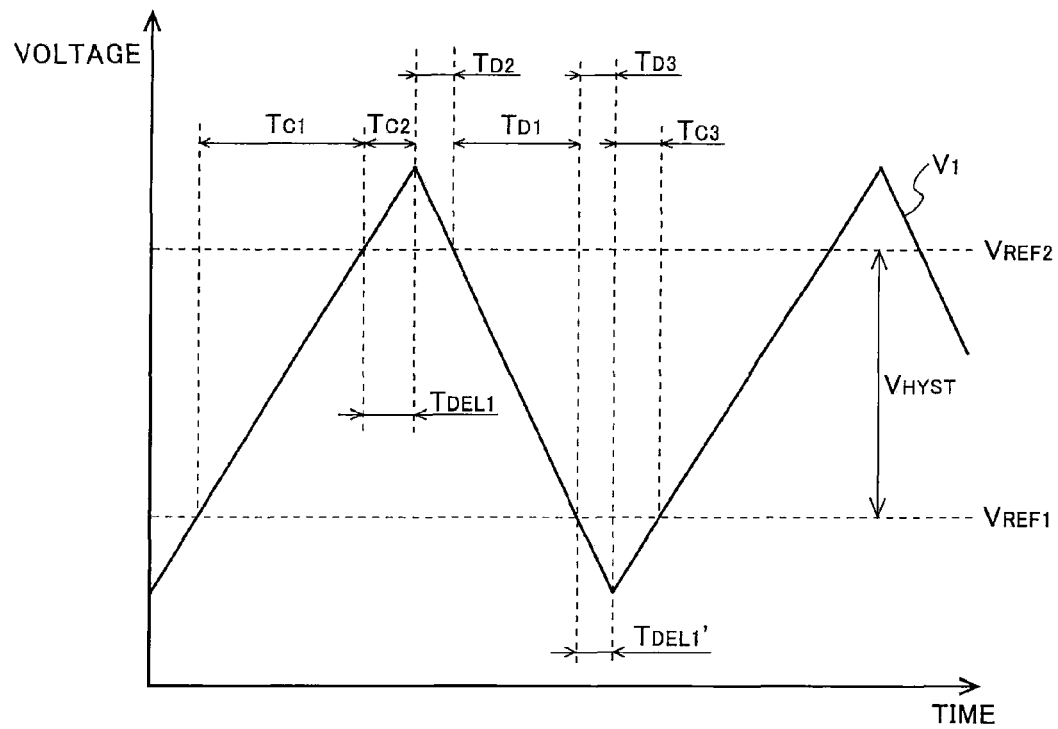
[FIG. 3] A diagram showing the voltage waveform of the voltage fed to the inverting input terminal of the hysteresis comparator included in the switching regulator shown in FIG. 1.

The period $T_{HYST}$ required to charge and discharge the voltage difference $V_{HYST}$ between the first reference voltage $V_{REF1}$ and the second reference voltage $V_{REF2}$ is given by equation (3) according to equations (1) and (2) noted previously. Here, $T_{C1}$ represents the period (see FIG. 3 for the waveform diagram of the voltage $V_1$) required to charge the voltage $V_{HYST}$, $T_{D1}$ represents the period (see FIG. 3) required to discharge the voltage $V_{HYST}$ and $C_3$ represents the capacitance of the capacitor C3.

$$T_{HYST} = T_{C1} + T_{D1} \quad (3)$$
$$= \frac{C_3 \cdot V_{HYST}}{I_{CH}} + \frac{C_3 \cdot V_{HYST}}{I_{DCH}}$$
$$= \frac{V_{IN} \cdot C_3 \cdot V_{HYST} \cdot R_3}{V_O(V_{IN} - V_O)}$$

The charging and discharging period T of the capacitor C3 attributable to the delay period $T_{DEL1}$ occurring in the hysteresis comparator 1 is given by equation (4) according to equations (1) and (2) noted previously. Here, $T_{C2}$ represents the charging period (see FIG. 3) of the capacitor C3 attributable to the delay period $T_{DEL1}$ occurring in the hysteresis comparator 1; $T_{D2}$ represents the discharging period (see FIG. 3) of the capacitor C3 attributable to the delay period $T_{DEL1}$ occurring in the hysteresis comparator 1.

$$T = T_{C2} + T_{D2} \quad (4)$$
$$= T_{DEL1} + \frac{I_{CH} \cdot T_{DEL1}}{I_{DCH}}$$
$$= T_{DEL1}\left(1 + \frac{I_{CH}}{I_{DCH}}\right)$$
$$= T_{DEL1} \frac{V_{IN}}{V_O}$$

The charging and discharging period T' of the capacitor C3 attributable to the delay period $T_{DEL1}'$ occurring in the hysteresis comparator 1 is given by equation (5) according to equations (1) and (2) noted previously. Here, $T_{C3}$ represents the charging period (see FIG. 3) of the capacitor C3 attributable to the delay period $T_{DEL1}'$ occurring in the hysteresis comparator 1; $T_{D3}$ represents the discharging period (see FIG. 3) of the capacitor C3 attributable to the delay period $T_{DEL1}'$ occurring in the hysteresis comparator 1.

$$T' = T_{C3} + T_{D3} \quad (5)$$
$$= T_{DEL1}' + \frac{I_{DCH} \cdot T_{DEL1}'}{I_{CH}}$$
$$= T_{DEL1}'\left(1 + \frac{I_{DCH}}{I_{CH}}\right)$$
$$= T_{DEL1}' \frac{V_{IN}}{V_{IN} - V_O}$$

The switching period $T_S$ of the switching regulator shown in FIG. 1 is given by equation (6) according to equations (3), (4) and (5) noted above.

$$T_S = T_{HYST} + T + T' \quad (6)$$
$$= \frac{V_{IN} \cdot C_3 \cdot V_{HYST} \cdot R_3}{V_O(V_{IN} - V_O)} +$$
$$T_{DEL1} \frac{V_{IN}}{V_O} +$$
$$T_{DEL1}' \frac{V_{IN}}{V_{IN} - V_O}$$

The switching frequency of the switching regulator shown in FIG. 1 is the reciprocal of the switching period $T_S$ given by equation (6). Thus, the switching frequency of the switching regulator shown in FIG. 1 is determined by the capacitance $C_3$ of the capacitor C3 and the resistance $R_3$ of the resistor R3 irrespective of the inductance of the inductor L1 and the capacitance of the capacitor C1. By reducing the capacitance $C_3$ of the capacitor C3 and the resistance $R_3$ of the resistor R3, it is possible to increase the switching frequency of the switching regulator shown in FIG. 1. Thus, it is possible to increase the switching frequency without increasing the mounting area of the switching regulator. For example, it is possible to set the switching frequency of the switching regulator shown in FIG. 1 at a switching frequency, for example, in the order of megahertz. By increasing the switching frequency in this way, it is possible to reduce the ripple in the output voltage $V_O$.

In the switching regulator shown in FIG. 1, the switching frequency is lower than the ideal frequency by the value corresponding to the delay period ($T_{DEL1}+T_{DEL1}'$) occurring in the hysteresis comparator 1, and is not affected by the delay periods occurring in the driver circuit 3, the PMOS transistor Q1 and the NMOS transistor Q2. Thus, in the switching regulator shown in FIG. 1, the switching frequency is not so much lower than the ideal frequency as is conventionally unavoidable, resulting in a smaller ripple in the output voltage $V_O$.

Figure 4:
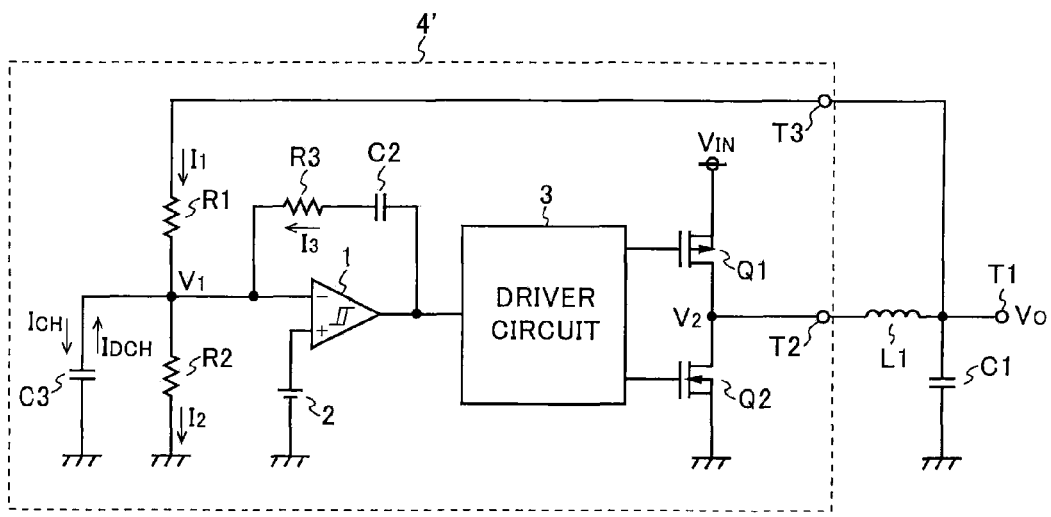
[FIG. 4] A diagram showing another example of the configuration of a switching regulator according to the invention.

Another example of the configuration of a switching regulator according to the invention is shown in FIG. 4. In FIG. 4, such parts as are found also in FIG. 1 are identified with common reference numerals, and no detailed description thereof will be repeated. The switching regulator shown in FIG. 4 differs from that shown in FIG. 1 in that the capacitor C3 is connected not in parallel to the resistor R1, but in parallel to the resistor R2.

The switching regulator shown in FIG. 4, like that shown in FIG. 1, not only can increase the switching frequency without increasing the mounting area of the switching regulator, but also can alleviate the lowering in the switching frequency with respect to the ideal frequency. This helps reduce the ripple in the output voltage $V_O$.

In the switching regulator shown in FIG. 4, however, when the output voltage $V_O$ varies at a high frequency, the voltage V1 varies less than that of the switching regulator shown in FIG. 1. Thus, the switching regulator shown in FIG. 4 has poor responsiveness to a sharply varying load connected to the output terminal T1 as compared with that shown in FIG. 1. Hence, the switching regulator shown in FIG. 1 is preferable to that shown in FIG. 4.

Although this embodiment discusses an example where the output voltage $V_O$ is divided with the resistors R1 and R2, the invention is not limited to such a configuration; instead, the voltage obtained by superimposing the output voltage $V_O$ on the ramp voltage may be fed to the inverting input terminal of the hysteresis comparator 1. For example, the resistors R1 and R2 may be omitted from the switching regulator shown in FIG. 4 so that the terminal T3 is directly connected to the node between the resistor R3, the capacitor C3 and the inverting input terminal of the hysteresis comparator 1.

Switching regulators according to the invention can be applied to power supplies in electrical devices in general. In particular, since these switching regulators can increase the switching frequency without increasing the time constant of a smoothing circuit for smoothing a signal corresponding to the switching operation of a switching element to generate the output voltage of the switching regulators, they are suitable for portable devices in which reduction of the mounting areas of their power supplies is sought.

Figure 5:
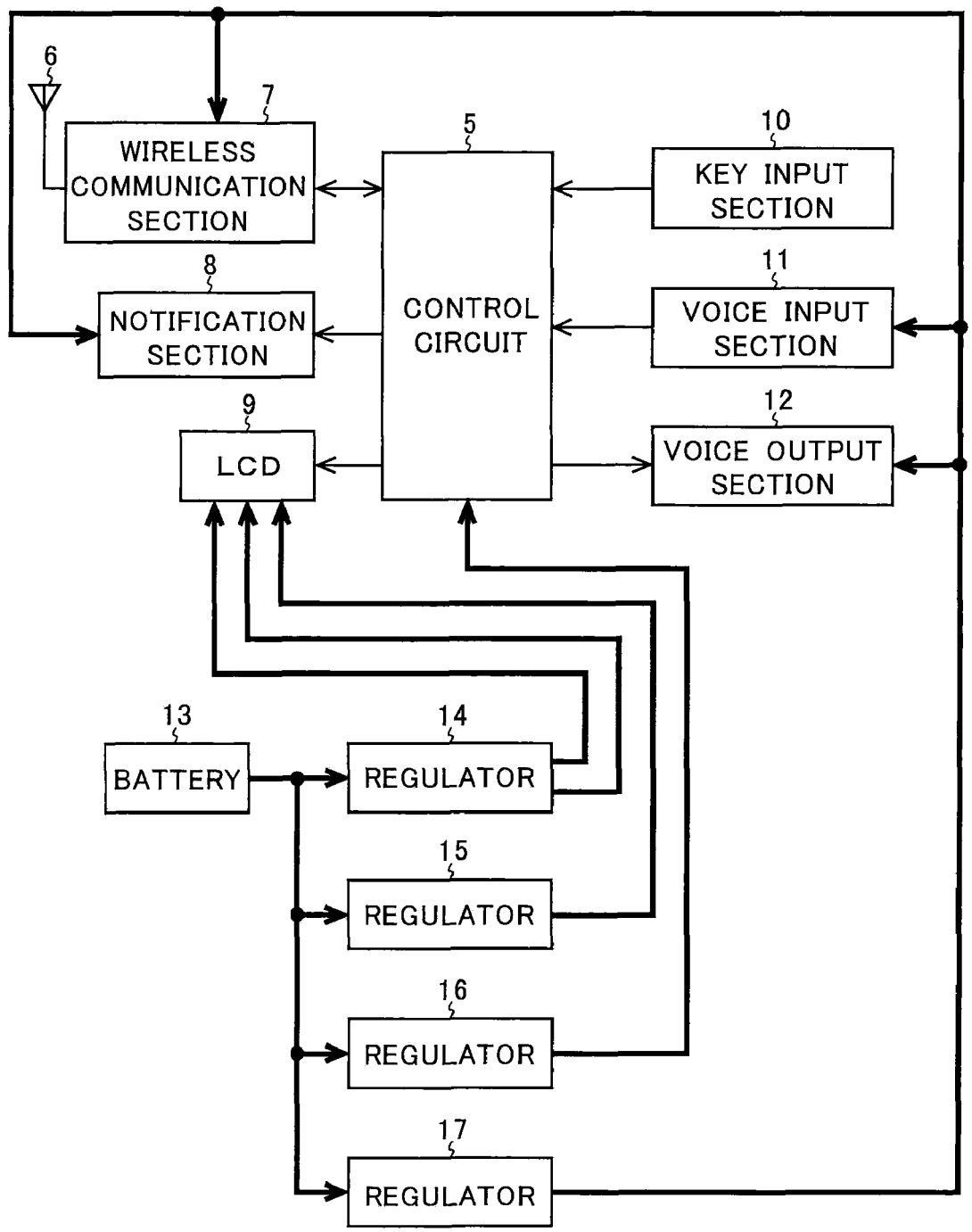
[FIG. 5] A diagram showing an example of the circuit blocks provided in a mobile telephone according to the invention.

Now, a description will be given of, as an example of a portable device according to the invention, a mobile telephone. An example of the circuit block of the mobile telephone according to the invention is shown in FIG. 5. The mobile telephone shown in FIG. 5 includes: a control circuit 5 for controlling the mobile telephone as a whole; an antenna 6; a wireless communication section 7 for transmitting and receiving to and from a base station via the antenna 6; a notification section 8 for indicating an incoming call by way of sound or vibration; a liquid crystal display (LCD) 9 for displaying information such as a telephone number on a display screen; a key-input section 10; a voice input section 11 for receiving the voice of an operator in voice communication to convert it into an electrical signal; a voice output section 12 for converting an electrical signal corresponding to the voice of a caller in voice communication into sound so as to output the sound; a battery 13; and regulators 14 to 17. The regulator 14 converts a direct-current voltage outputted from the battery 13 into first and second predetermined direct-current voltages to feed as drive voltages the first and second predetermined direct-current voltages to the gate driver and source driver, respectively, of the liquid crystal display 9. The regulator 15 converts the direct-current voltage outputted from the battery 13 into a predetermined direct-current voltage to feed this voltage as a drive voltage to the backlight of the liquid crystal display 9. The regulator 16 converts the direct-current voltage outputted from the battery 13 into a predetermined direct-current voltage to feed this voltage as a drive voltage to the control circuit 5. The regulator 17 converts the direct-current voltage outputted from the battery 13 into a predetermined direct-current voltage to feed this voltage as drive voltages to the wireless communication section 7, the notification section 8, the voice input section 11 and the voice output section 12. The switching regulator shown in FIG. 1 is used as the regulator 15.

INDUSTRIAL APPLICABILITY

Switching circuits for switching regulators according to the present invention can be applied to switching regulators that switch a switching element based on the output of a hysteresis comparator. These switching regulators can be used as power supplies in electrical devices in general.

What is claimed is:

1. A switching circuit for a switching regulator, the switching circuit comprising:
    a hysteresis comparator;
    a switching element switched based on an output of the hysteresis comparator;
    a first terminal arranged to output a signal corresponding to a switching operation of the switching element;
    a second terminal arranged to receive an output voltage of the switching regulator;
    a first resistor having one end connected to the second terminal and having another end connected to an inverting input terminal of the hysteresis comparator;
    a second resistor having one end connected to the other end of the first resistor and having another end connected to a fixed potential;
    a first capacitor having one end connected to the second terminal and having another end connected to the inverting input terminal of the hysteresis comparator;
    a third resistor having one end connected to the inverting input terminal of the hysteresis comparator; and
    a second capacitor having one end connected to another end of the third resistor and having another end connected to an output terminal of the hysteresis comparator,
    wherein the hysteresis comparator is arranged to compare a reference voltage with a voltage obtained by superimposing a ramp signal generated from an alternating-current component in an output of the hysteresis comparator by the third resistor and the first capacitor on a divided voltage obtained by dividing the output voltage of the switching regulator with the first resistor and the second resistor.

2. An electrical device including a switching regulator,
wherein the switching regulator is arranged to switch a switching element based on an output of a hysteresis comparator, wherein the switching regulator comprises:
a first resistor having one end connected to a potential of an output voltage of the switching regulator and another end connected to an inverting input terminal of the hysteresis comparator;
a second resistor having one end connected to the other end of the first resistor and having another end connected to a fixed potential;
a first capacitor having one end connected to the potential of the output voltage of the switching regulator and having another end connected to the inverting input terminal of the hysteresis comparator;
a third resistor having one end connected to the inverting input terminal of the hysteresis comparator; and
a second capacitor having one end connected to an other end of the third resistor and having another end connected to an output terminal of the hysteresis comparator,
wherein the hysteresis comparator is arranged to compare a reference voltage with a voltage obtained by superimposing a ramp signal generated from an alternating-current component in an output of the hysteresis comparator by the third resistor and the first capacitor on a divided voltage obtained by dividing the output voltage of the switching regulator with the first resistor and the second resistor.

3. The electrical device of claim 2, wherein the electrical device is a portable device.

* * * * *